United States Patent
Zhang et al.

(10) Patent No.: US 10,144,417 B1
(45) Date of Patent: Dec. 4, 2018

(54) HITCH ASSIST SYSTEM AND METHOD FEATURING A SPECIFIED ANGLE BETWEEN A VEHICLE HEADING AND A TRAILER HEADING AT A FINAL POSITION

(71) Applicant: Ford Global Technologies, LLC, Dearborn, MI (US)

(72) Inventors: Chen Zhang, Canton, MI (US); Luke Niewiadomski, Hamtramck, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/839,131

(22) Filed: Dec. 12, 2017

(51) Int. Cl.
*B60W 30/06* (2006.01)
*B60W 40/02* (2006.01)
*B60W 50/04* (2006.01)

(52) U.S. Cl.
CPC ............ *B60W 30/06* (2013.01); *B60W 40/02* (2013.01); *B60W 2050/046* (2013.01); *B60W 2420/42* (2013.01); *B60W 2550/10* (2013.01)

(58) Field of Classification Search
CPC .. B60W 30/06; B60W 40/02; B60W 2550/10; B60W 2420/42; B60W 2050/046
See application file for complete search history.

(56) References Cited

U.S. PATENT DOCUMENTS

| | | | | |
|---|---|---|---|---|
| 4,708,359 A * | 11/1987 | Davenport | ............... | B60D 1/36 280/477 |
| 7,005,974 B2 * | 2/2006 | McMahon | ............. | B60Q 9/005 248/200 |
| 9,233,710 B2 * | 1/2016 | Lavoie | ................... | B62D 13/06 |
| 9,428,220 B2 * | 8/2016 | Hueger | .................. | B62D 13/06 |
| 2003/0209880 A1 * | 11/2003 | Koestler | .................. | B60D 1/36 280/477 |
| 2010/0096203 A1 * | 4/2010 | Freese V | ................. | B60D 1/36 180/167 |
| 2013/0226390 A1 * | 8/2013 | Luo | .......................... | B60D 1/36 701/25 |
| 2014/0085472 A1 * | 3/2014 | Lu | .......................... | B60R 1/002 348/148 |
| 2014/0226009 A1 * | 8/2014 | Lynam | ................... | B60K 35/00 348/148 |
| 2014/0249723 A1 * | 9/2014 | Pilutti | .................. | B62D 15/027 701/42 |
| 2015/0321697 A1 * | 11/2015 | Lu | .......................... | B60D 1/245 701/28 |
| 2016/0052548 A1 * | 2/2016 | Singh | ....................... | B60D 1/36 701/37 |
| 2016/0075281 A1 * | 3/2016 | Singh | ....................... | B60D 1/36 348/118 |
| 2016/0264052 A1 * | 9/2016 | Lynam | ................... | B60K 35/00 |
| 2016/0378118 A1 * | 12/2016 | Zeng | .................... | G05D 1/0246 701/28 |
| 2017/0001566 A1 * | 1/2017 | Lu | .......................... | B60R 1/002 |
| 2018/0043828 A1 * | 2/2018 | Lu | .......................... | B60R 1/002 |

* cited by examiner

*Primary Examiner* — Russell Frejd
(74) *Attorney, Agent, or Firm* — Frank MacKenzie; Price Heneveld LLP

(57) ABSTRACT

A hitch assist system and method are provided herein. A detection system determines a vehicle heading and a trailer heading. A controller is coupled to the detection system for generating a path along which the vehicle is autonomously maneuvered toward a trailer. The path ends at a final position in which the vehicle and trailer headings are related by a specified angle therebetween.

20 Claims, 5 Drawing Sheets

HITCH ASSIST SYSTEM AND METHOD FEATURING A SPECIFIED ANGLE BETWEEN A VEHICLE HEADING AND A TRAILER HEADING AT A FINAL POSITION

FIELD OF THE INVENTION

The present invention generally relates to a hitch assist system, and more particularly, to a hitch assist system providing greater user control regarding a relative orientation between a vehicle and a trailer at a final position in which a tow hitch of a vehicle is aligned with a hitch coupler of a trailer.

BACKGROUND OF THE INVENTION

Hitch assist systems generally function to autonomously maneuver a vehicle along a path toward a trailer such that the vehicle's tow hitch is aligned with the trailer's hitch coupler at the end of the path. In many systems, a user, typically the driver, relinquishes control of the vehicle to the system, which performs the task of maneuvering the vehicle toward the trailer along the path. In such systems, the path taken by the vehicle toward the trailer along with the final orientation between the vehicle and the trailer at the end of the path are largely dictated by the system. As a result, a user desiring a particular path or final orientation has no means of achieving the same or is forced to perform additional and oftentimes unnecessary vehicle maneuvers before relinquishing control of the vehicle to the system. Accordingly, there is a need for a system that offers greater freedom in choosing a particular path and/or final orientation in a manner that is simple and convenient. The present disclosure is intended to satisfy this need.

SUMMARY OF THE INVENTION

According to a first aspect of the present invention, a hitch assist system is provided. A detection system determines a vehicle heading and a trailer heading. A controller is coupled to the detection system for generating a path along which the vehicle is autonomously maneuvered toward a trailer. The path ends at a final position in which the vehicle and trailer headings are related by a specified angle therebetween.

Embodiments of the first aspect of the invention can include any one or a combination of the following features:
  the detection system includes at least one of an imager, a global positioning device, an inertial system, and one or more proximity sensors;
  a tow hitch of the vehicle is aligned with a hitch coupler of the trailer at the final position;
  the specified angle is inputted to the controller via a user-input device;
  the specified angle is determined by the controller based on input received from the detection system;
  the path is substantially straight and the specified angle is non-zero;
  the vehicle heading at the final position matches an initial heading of the vehicle prior to the vehicle being maneuvered along the path;
  the path is curved and the vehicle and trailer headings are in straight alignment at the final position;
  the vehicle heading at the final position is different than an initial heading of the vehicle prior to the vehicle being maneuvered along the path;
  the specified angle includes an allowable deviation range; and
  the allowable deviation range is set by the controller or inputted thereto via a user-input device.

According to a second aspect of the present invention, a hitch assist system is provided. A user-input device is configured to receive user input specifying an angle between a vehicle heading and a trailer heading. A controller is configured to generate a path along which the vehicle is autonomously maneuvered toward the trailer and ending at a final position in which the vehicle is able to be hitched to the trailer and the vehicle and trailer headings are relatively positioned at the specified angle.

Embodiments of the second aspect of the invention can include any one or a combination of the following features:
  a detection system configured to determine the vehicle and trailer headings and having at least one of an imager, a global positioning device, an inertial system, and one or more proximity sensors;
  the path is substantially straight and the specified angle is non-zero;
  the vehicle heading at the final position matches an initial heading of the vehicle prior to the vehicle being maneuvered along the path;
  the path is curved and the vehicle and trailer headings are in straight alignment at the final position;
  the vehicle heading at the final position is different than an initial heading of the vehicle prior to the vehicle being maneuvered along the path;
  the specified angle includes an allowable deviation range; and
  the allowable deviation range is set by the controller or inputted thereto via the user-input device.

According to a third aspect of the present invention, a hitch assist method is provided and includes the steps of providing a user-input device for inputting a specified angle between a vehicle heading and a trailer heading to a controller, setting an allowable deviation range for the specified angle via the user-input device, and using the controller to generate a path and commands for autonomously maneuvering the vehicle along the path, the path ending at a final position in which the vehicle and trailer headings are related by the specified angle or another angle encompassed by the allowable deviation range.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
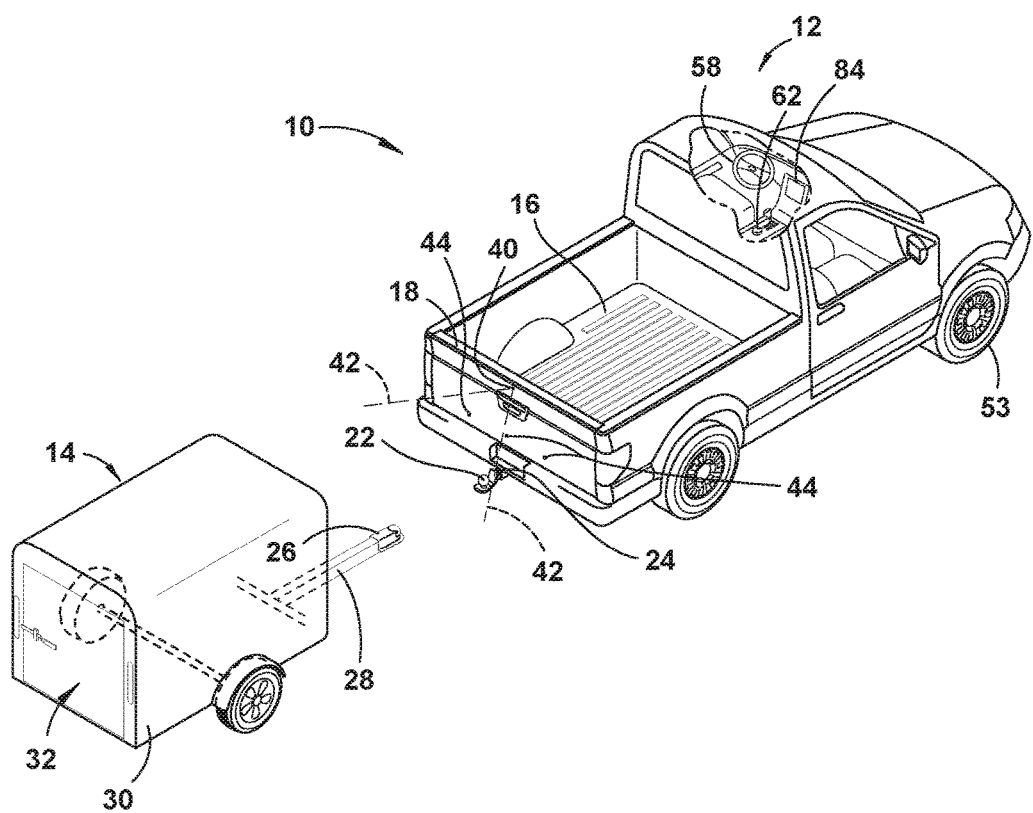
FIG. 1 illustrates a vehicle and a trailer, the vehicle being equipped with a hitch assist system according to one embodiment.
Figure 2:
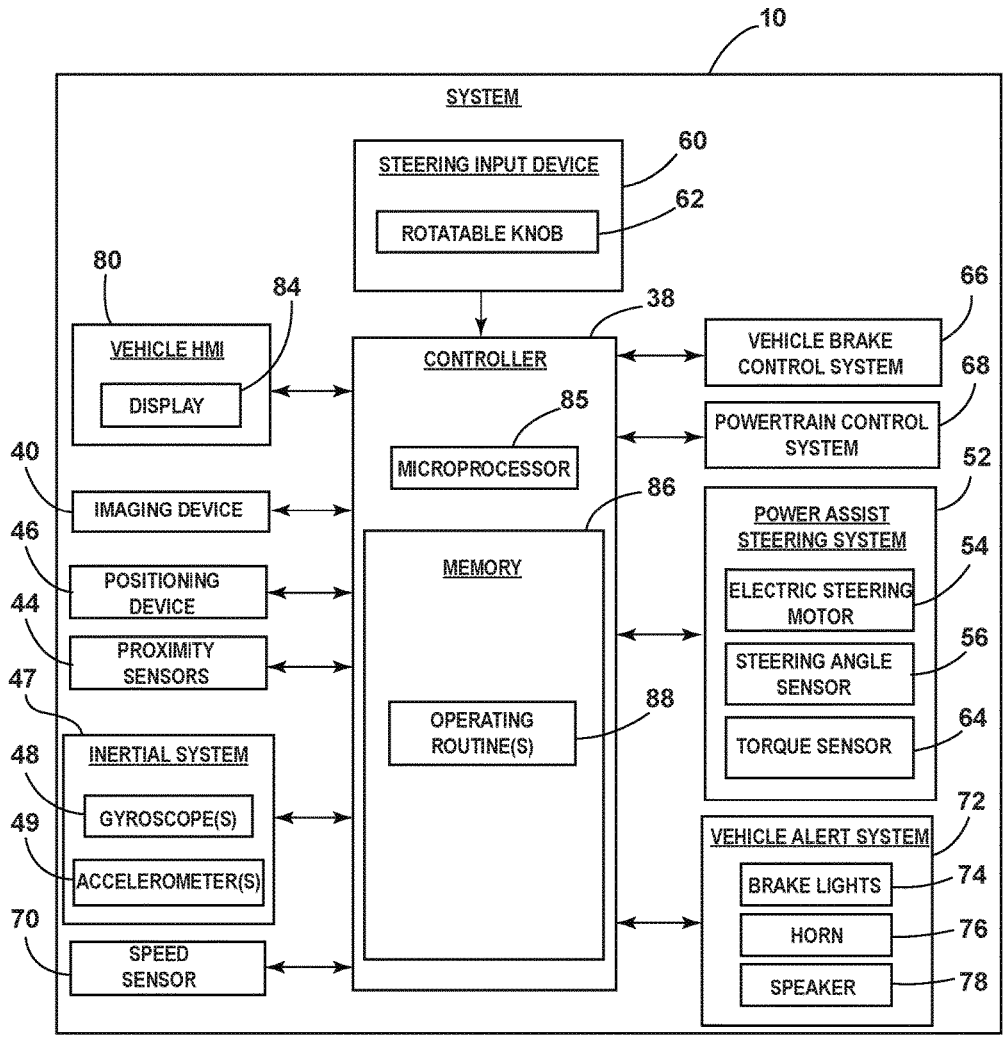
FIG. 2 is a block diagram illustrating components of the hitch assist system.

Referring to FIGS. 1 and 2, reference numeral 10 generally designates a hitch assist system for autonomously maneuvering a vehicle 12 toward a trailer 14. The vehicle 12 is exemplarily embodied as a pickup truck having a truck bed 16 that is accessible via a fold down tailgate 18. The vehicle 12 also includes a tow hitch in the form of a hitch ball 22 extending from a drawbar 24 that is coupled to the rear of the vehicle 12. The hitch ball 22 is configured to be received by a hitch coupler in the form of a coupler ball socket 26 that is provided at a terminal end of a trailer tongue 28. The trailer 14 is exemplarily embodied as a single axle trailer having a box frame 30 with an enclosed cargo area 32 from which the tongue 28 extends longitudinally.

The system 10 includes a controller 38 in communication with an imager 40 located at the rear of the vehicle 12. The imager 40 may be centrally located at an upper region of the tailgate 18 such that the imager 40 is elevated relative to the drawbar 24 and the hitch ball 22. The imager 40 has a field of view 42 located and oriented to capture one or more images of a rear-vehicle scene that generally includes the hitch ball 22, among other things. Images captured by the imager 40 may be processed by the controller 38 to identify a hitch coupler such as the coupler ball socket 26.

In addition to communicating with the imager 40, the controller 38 may communicate with a number of proximity sensors 44 exemplarily shown as ultrasonic sensors spaced across a lower region of the vehicle tailgate 18 and configured to detect the proximity or distance of objects located rearward of the vehicle 12. Additional vehicle-related information may be provided to the controller 38 by a positioning device 46, such as a global positioning system (GPS) located on the vehicle 12 and/or the trailer 14. Additionally, the controller 38 may communicate with an inertial system 47 including one or more gyroscopes 48 and accelerometers 49 to measure the position, orientation, direction, and/or speed of the vehicle 12.

To enable autonomous or semi-autonomous control of the vehicle 12, the controller 38 of system 10 may be further configured to communicate with a variety of vehicle equipment. According to one embodiment, the controller 38 of the system 10 may control a power assist steering system 52 of the vehicle 12 to operate the steered wheels 53 of the vehicle 12 while the vehicle 12 is reversed toward the trailer 14 along a path generated by the controller 38. The power assist steering system 52 may be an electric power-assisted steering (EPAS) system that includes an electric steering motor 54 for turning the steered wheels 53 to a steering angle based on a steering command generated by the controller 38, whereby the steering angle may be sensed by a steering angle sensor 56 of the power assist steering system 52 and provided to the controller 38. As described herein, the steering command may be provided for autonomously steering the vehicle 12 during a backup maneuver and may alternatively be provided manually via a rotational position (e.g., a steering wheel angle) of a steering wheel 58 or a steering input device 60, which may be provided to enable a driver to control or otherwise modify the desired curvature of the backing path of vehicle 12. The steering input device 60 may be communicatively coupled to the controller 38 in a wired or wireless manner and provides the controller 38 with information defining the desired curvature of the backing path of the vehicle 12. In response, the controller 38 processes the information and generates corresponding steering commands that are supplied to the power assist steering system 52 of the vehicle 12. In one embodiment, the steering input device 60 includes a rotatable knob 62 operable between a number of rotated positions that each provides an incremental change to the desired curvature of the backing path of the vehicle 12.

In some embodiments, the steering wheel 58 of the vehicle 12 may be mechanically coupled with the steered wheels 53 of the vehicle 12, such that the steering wheel 58 moves in concert with steered wheels 53 via an internal torque, thereby preventing manual intervention with the steering wheel 58 during autonomous steering of the vehicle 12. In such instances, the power assist steering system 52 may include a torque sensor 64 that senses torque (e.g., gripping and/or turning) on the steering wheel 58 that is not expected from autonomous control of the steering wheel 58 and therefore indicative of manual intervention by the driver. In some embodiments, external torque applied to the steering wheel 58 may serve as a signal to the controller 38 that the driver has taken manual control and for the system 10 to discontinue autonomous steering functionality.

The controller 38 of the system 10 may also communicate with a vehicle brake control system 66 of the vehicle 12 to receive vehicle speed information such as individual wheel speeds of the vehicle 12. Additionally or alternatively, vehicle speed information may be provided to the controller 38 by a powertrain control system 68 and/or a vehicle speed sensor 70, among other conceivable means. In some embodiments, the controller 38 may provide braking commands to the vehicle brake control system 66, thereby allowing the system 10 to regulate the speed of the vehicle 12 during a backup maneuver of the vehicle 12. It should be appreciated that the controller 38 may additionally or alternatively regulate the speed of the vehicle 12 via interaction with the powertrain control system 68.

Through interaction with the power assist steering system 52, the vehicle brake control system 66, and/or the powertrain control system 68 of the vehicle 12, the potential for unacceptable backup conditions can be reduced when the vehicle 12 is backing toward the trailer 14. Examples of unacceptable backup conditions include, but are not limited to, a vehicle over-speed condition, sensor failure, and the like. In such circumstances, the driver may be unaware of the failure until the unacceptable backup condition is imminent or already happening. Therefore, it is disclosed herein that the controller 38 of the system 10 can generate an alert signal corresponding to a notification of an actual, impending, and/or anticipated unacceptable backup condition, and prior to driver intervention, generate a counter measure to prevent such an unacceptable backup condition.

According to one embodiment, the controller 38 may communicate with one or more devices, including a vehicle alert system 72, which may prompt visual, auditory, and tactile warnings. For instance, vehicle brake lights 74 and vehicle emergency flashers may provide a visual alert and a vehicle horn 76 and/or speaker 78 may provide an audible alert. Additionally, the controller 38 and/or vehicle alert system 72 may communicate with a human machine interface (HMI) 80 of the vehicle 12. The HMI 80 may include a touchscreen display 84 such as a center-stack mounted navigation or entertainment display capable of displaying images indicating the alert. Such an embodiment may be desirable to notify the driver of the vehicle 12 that an unacceptable backup condition is present.

The controller 38 is configured with a microprocessor 85 and/or other analog and/or digital circuitry for processing one or more logic routines stored in a memory 86. The logic routines may include one or more operating routines 88. Information from the imager 40 or other components of the system 10 can be supplied to the controller 38 via a communication network of the vehicle 12, which can include a controller area network (CAN), a local interconnect network (LIN), or other conventional protocols used in the automotive industry. It should be appreciated that the controller 38 may be a stand-alone dedicated controller or may be a shared controller integrated with the imager 40 or other component of the system 10 in addition to any other conceivable onboard or off-board vehicle control systems.

Figure 3:
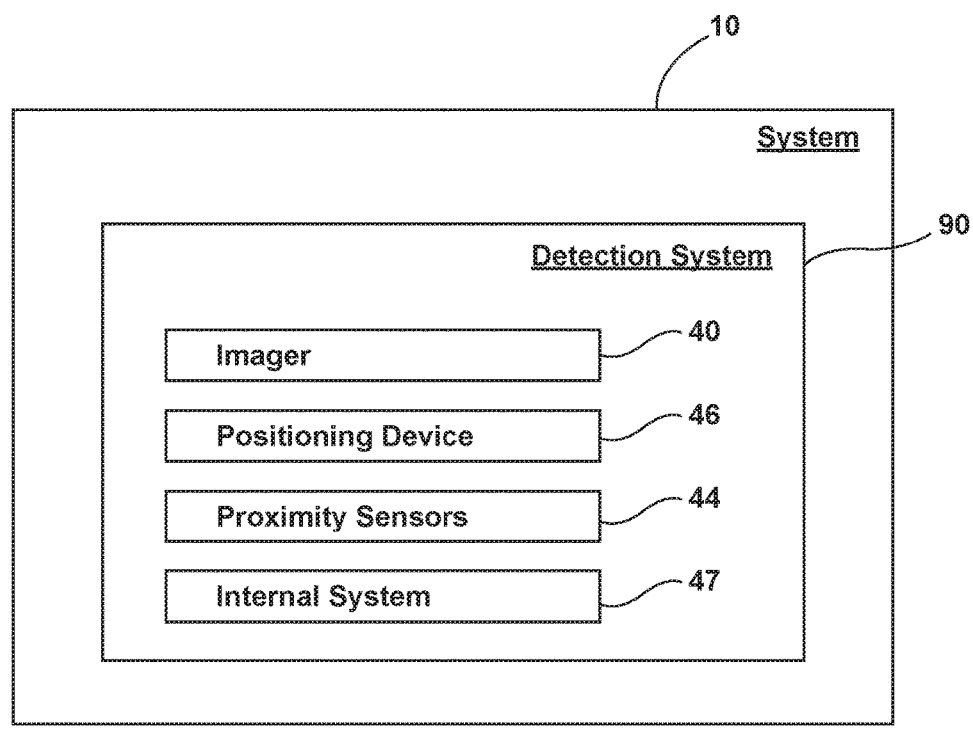
FIG. 3 is a block diagram illustrating a detection system of the hitch assist system.

Referring to FIG. 3, the system 10 includes a detection system 90 coupled to the controller 38. The detection system 90 is configured to determine a vehicle heading and a trailer heading. In some embodiments, the detection system 90 may also serve to detect other objects proximate the vehicle 12 and/or the trailer 14. As defined herein, the vehicle heading corresponds to the direction the front of the vehicle 12 is pointing and the trailer heading corresponds to the direction the front of the trailer 14 is pointing. To this end, the detection system 90 may include the imager 40, the positioning device 46, the proximity sensors 44, the inertial system 47, a combination thereof, and/or other suitable devices. For example, the vehicle heading may be determined using the positioning device 46 (e.g., GPS) and/or the inertial system 47. The trailer heading may be determined using captured images from the imager 40 and information from the proximity sensors 44. As described herein, the proximity sensors 44 may include ultrasonic sensors. However, it is conceived that other sensors in the form of radar and/or LIDAR may also be employed, for example. In some embodiments, the trailer heading may be ascertained from input provided to the controller 38 by a positioning device (e.g., GPS) and/or an inertial system located on the trailer 14.

Figure 4:
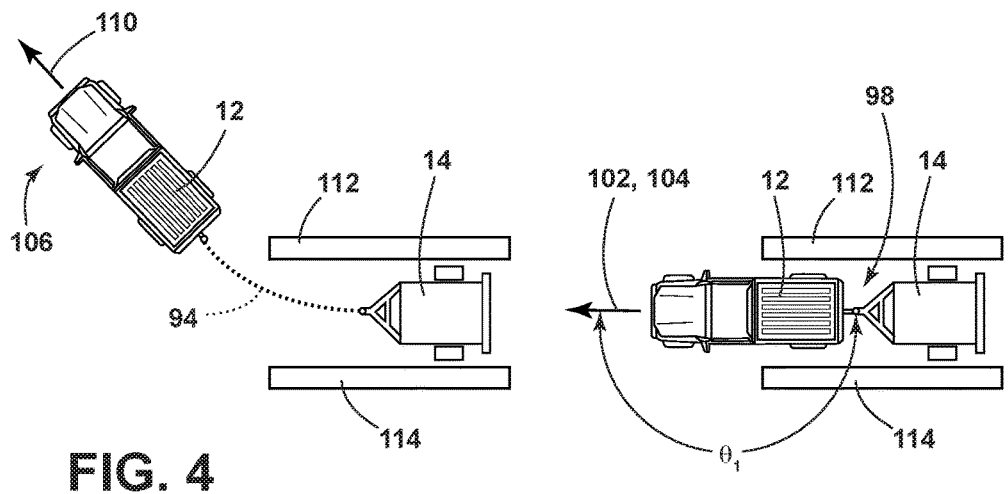
FIG. 4 illustrates a path generated by a controller of the hitch assist system based on a specified angle relating a vehicle heading and a trailer heading at a final position.
Figure 5:
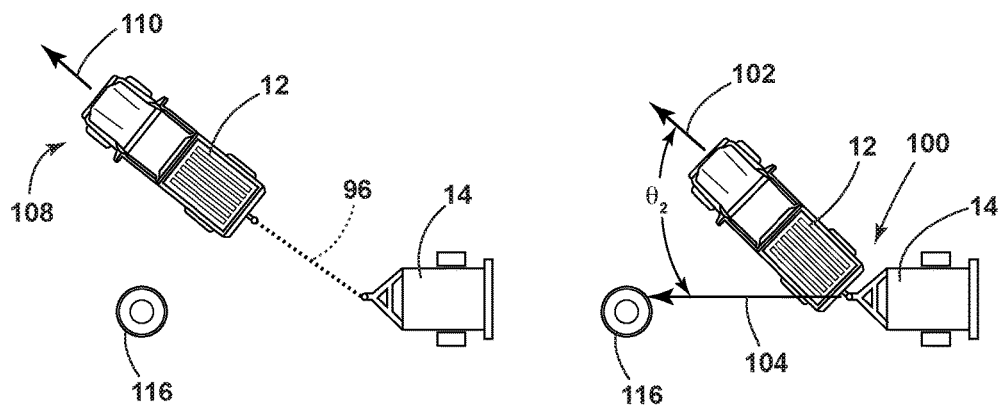
FIG. 5 illustrates another path generated by the controller based on another specified angle relating the vehicle heading and the trailer heading at the final position.

Referring to FIGS. 4 and 5, the controller 38 generates a path 94, 96 along which the vehicle 12 is autonomously maneuvered toward the trailer 14. As shown, the paths 94, 96 end at a final position 98, 100 in which the vehicle and trailer headings, shown as arrows 102 and 104, respectively, are related by a specified angle $\theta_1$, $\theta_2$ therebetween. At the final position 98, 100, the tow hitch (e.g., hitch ball 22; FIG. 1) of the vehicle 12 is generally aligned with the hitch coupler (e.g., coupler ball socket 26; FIG. 1) of the trailer 14. Accordingly, it will be understood that the vehicle 12 is able to be hitched to the trailer 14 at the final position 98, 100. Generally, the path 94, 96 taken by the vehicle 12 toward the trailer 14 is based on the specified angle $\theta_1$, $\theta_2$, detection and identification of the hitch coupler of the trailer 14, and a start position 106, 108 of the vehicle 12 relative to the trailer 14.

With respect to the embodiments described herein, the hitch coupler of the trailer 14 may be identified by the controller 38 by processing images captured by the imager 40. The specified angle $\theta_1$, $\theta_2$ is inputted to the controller 38 via a user-input device such as HMI 80. User-input may be provided to the HMI 80 via a touchscreen, knobs, buttons, and the like. The system 10 may prompt the user to input the specified angle $\theta_1$, $\theta_2$ prior to generating the corresponding path 94, 96. For purposes of understanding, the embodiments of FIGS. 4 and 5 are provided as examples of two different scenarios in which the user may input different specified angles $\theta_1$, $\theta_2$ for generating different paths 94, 96 toward the trailer 14. However, based on the disclosure provided herein, it will be understood that additional specified angles are possible based on the needs or preferences of the user.

With specific reference to the embodiment shown in FIG. 4, the vehicle 12 is exemplarily positioned at an initial heading 110 and is located in front of and to the right of the trailer 14 at the start position 106. A user desiring to achieve a straight alignment between the vehicle 12 and the trailer 14 may input zero degrees as the specified angle $\theta_1$ or otherwise select a straight alignment feature using the HMI 80 or some other user-input device. In response, the controller 38 generates the path 94 required so that the vehicle 12 and the trailer 14 are in straight alignment at the final position 98. In the depicted embodiment, the path 94 generated by the controller 38 is curved to ensure straight alignment between the vehicle 12 and the trailer 14 at the final position 98. Additionally, the vehicle heading 102 at the final position 98 is different than the initial heading 110 of the vehicle 12 at the start position 106. This straight alignment feature may be useful in instances where the trailer 14 is parked in a defined parking space exemplarily shown by boundary lines 112 and 114.

With specific reference to the embodiment shown in FIG. 5, the start position 108 of the vehicle 12 is similar to that of the vehicle 12 shown in FIG. 4. In the depicted embodiment, an object 116 is located in front of the trailer 14. For purposes of understanding, it is assumed that the object 116 is positioned such that a path yielding straight alignment between the vehicle 12 and the trailer 14 may result in a collision between the vehicle 12 and the object 116. Accordingly, a user desiring to hitch the vehicle 12 to the trailer 14 may instead input a non-zero angle as the specified angle $\theta_2$. As one specific example, the user may input 45 degrees, for example, as the specified angle $\theta_2$, and in response, the controller 38 generates the path 96 toward the trailer 14 based on the specified angle $\theta_2$. It is contemplated that the controller 38 may instruct the user to input a different specified angle or modify the path 96 if the same is insufficient to avoid collision with the object 116.

In the depicted embodiment of FIG. 5, the path 96 enables the vehicle 12 to avoid collision with the object 116 and is generally shown as a straight path. For convenience, a user desiring to back the vehicle 12 along a substantially straight path may select a straight backup feature using HMI 80 instead of inputting a specific angle as the specified angle $\theta_2$. It is contemplated that the controller 38 may determine if the straight backup feature is available based on input received from the detection system 90. Notably, in instances where the vehicle 12 is backed along a straight path toward the trailer 14, the vehicle heading 102 at the final position 100 may match the initial heading 110 of the vehicle 12 at the start position 108 prior to the vehicle 12 being maneuvered along the path 96.

In alternative embodiments, a user may defer selection of the specified angle to the system 10. In such instances, the controller 38 may determine the specified angle based on input received from the detection system 90. As described herein, the input may include positional information related to the heading of the vehicle 12 and the trailer 14 and/or detection of other objects proximate thereto. Alternatively, the controller 38 may use a default specified angle to generate a path toward the trailer 14 and modify the path as necessary to avoid any detected objects. With respect to any of the embodiments described herein, the specified angle may include an allowable deviation range set by a user (e.g., via HMI 80) or the controller 38. For example, a user may input a specified angle of 0 degrees and subsequently set an allowable deviation range of ±10 degrees. In response, the controller 38 is free to generate a path resulting in the vehicle and trailer headings being related by an angle between −10 and 10 degrees at the final position. In this manner, the controller 38 is provided greater flexibility in regards to path generation.

Figure 6:
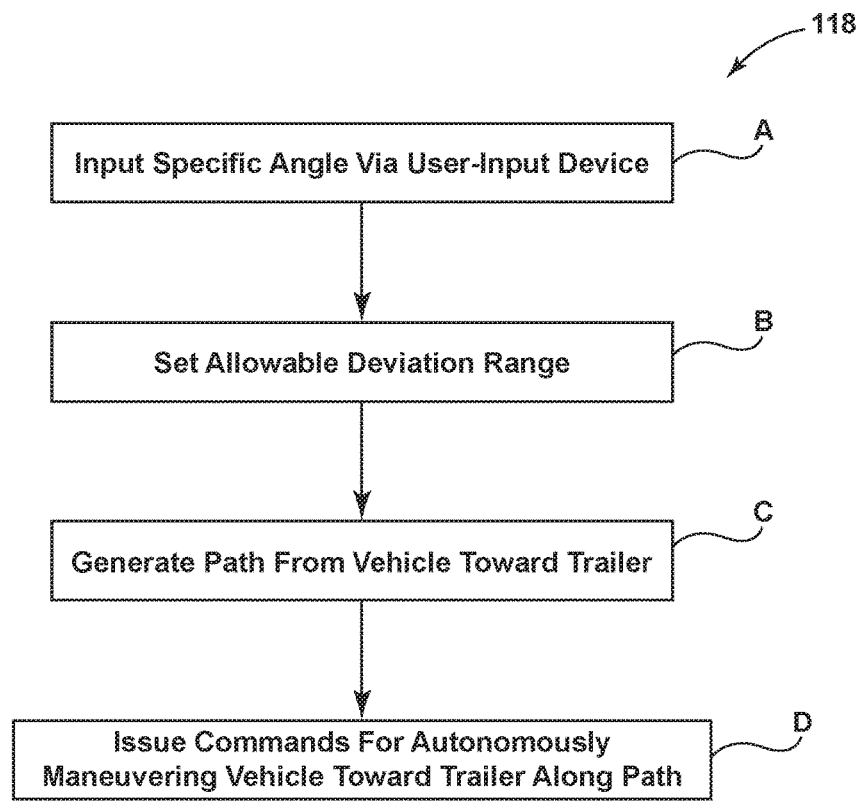
FIG. 6 is a flow diagram of a hitch assist method implemented by the hitch assist system.

Referring to FIG. 6, a hitch assist method 118 is shown and may be embodied as one of the operating routines 88 of the system 10. At step A, a specified angle is inputted to the controller 38 via a user-input device such as HMI 80. Optionally, at step B, an allowable deviation range for the specified angle is set by a user or the controller 38. At step C, the controller 38 generates a path from the vehicle 12 toward the trailer 14 based on the specified angle or another angle encompassed by the allowable deviation range. At step D, the controller 38 issues commands for autonomously maneuvering the vehicle 12 toward the trailer 14 along the path. As described herein, the path terminates at the final position in which the tow hitch of the vehicle 12 is generally aligned with the hitch coupler of the trailer 14 and the vehicle and trailer headings are related by the specified angle or another angle encompassed by the allowable deviation range.

Accordingly, a hitch assist system has been provided herein. In some embodiments, the system enables a user to input a specified angle relating a vehicle heading and a trailer heading at a final position in which the vehicle is able to be hitched to a trailer. Based on the specified angle, a controller generates a path for autonomously maneuvering the vehicle toward the trailer, the path terminating at the final position. In other embodiments, the specified angle may be set by the controller based on input received from a detection system configured to detect vehicle and trailer headings and objects proximate the vehicle and/or trailer. In some embodiments, the specified angle includes an allowable deviation range set by the user or the controller. Advantageously, the hitch assist system disclosed herein provides the user with greater freedom in dictating the positional relationship between the vehicle and the trailer headings at the final position. In embodiments incorporating the allowable deviation range, the controller is afforded greater flexibility with regards to path generation.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A hitch assist system comprising:
   a detection system for determining a vehicle heading and a trailer heading;
   a user-input device for accepting a specified angle of a vehicle heading relative a trailer heading; and
   a controller coupled to the detection system for generating a path in response to the inputted specified angle along which the vehicle is autonomously maneuvered toward a trailer, the path ending at a final position based on the specified angle.

2. The system of claim 1, wherein the detection system comprises at least one of an imager, a global positioning device, an inertial system, and one or more proximity sensors.

3. The system of claim 1, wherein a tow hitch of the vehicle is aligned with a hitch coupler of the trailer at the final position.

4. The system of claim 1, wherein the specified angle is inputted to the controller through the user-input device that is configured as a human-machine interface.

5. The system of claim 1, wherein the specified angle is determined by the controller based on input received from the detection system.

6. The system of claim 1, wherein the path is substantially straight and the specified angle is non-zero.

7. The system of claim 6, wherein the vehicle heading at the final position matches an initial heading of the vehicle prior to the vehicle being maneuvered along the path.

8. The system of claim 1, wherein the path is curved and the vehicle and trailer headings are in straight alignment at the final position.

9. The system of claim 8, wherein the vehicle heading at the final position is different than an initial heading of the vehicle prior to the vehicle being maneuvered along the path.

10. The system of claim 1, wherein the specified angle includes an allowable deviation range.

11. The system of claim 10, wherein the allowable deviation range is set by the controller or inputted thereto via a user-input device.

12. A hitch assist system comprising:
    a user-input device configured to receive user an inputted specified angle from a plurality of potential angles between a vehicle heading and a trailer heading after detecting a trailer; and
    a controller configured to generate a path in response to receiving the specified angle along which the vehicle is autonomously maneuvered and ending at a final position in which the vehicle and trailer headings are relatively positioned at the specified angle and instruct a user to input a different specified angle if the path is insufficient to avoid collision with an object.

13. The system of claim 12, further comprising a detection system configured to determine the vehicle and trailer headings and comprising at least one of an imager, a global positioning device, an inertial system, and one or more proximity sensors.

14. The system of claim 12, wherein the path is substantially straight and the specified angle is non-zero.

15. The system of claim 14, wherein the vehicle heading at the final position matches an initial heading of the vehicle prior to the vehicle being maneuvered along the path.

16. The system of claim 12, wherein the path is curved and the vehicle and trailer headings are in straight alignment at the final position.

17. The system of claim 16, wherein the vehicle heading at the final position is different than an initial heading of the vehicle prior to the vehicle being maneuvered along the path.

18. The system of claim 12, wherein the specified angle includes an allowable deviation range.

19. The system of claim 18, wherein the allowable deviation range is set by the controller or inputted thereto via the user-input device.

20. A hitch assist method comprising the steps of:
providing a user-input device for inputting a first specified angle between a vehicle heading and a trailer heading to a controller;
setting an allowable deviation range for the specified angle via the user-input device after inputting the first specified angle; and
using the controller to generate a path in response to the inputted first specified angle and commands for autonomously maneuvering the vehicle along the path, the path ending at a final position in which the vehicle and trailer headings are related by the first specified angle or another angle encompassed by the allowable deviation range; and
instructing input of a second specified angle if an object is disposed along the generated path.

* * * * *

UNITED STATES PATENT AND TRADEMARK OFFICE
CERTIFICATE OF CORRECTION

PATENT NO. : 10,144,417 B1  Page 1 of 1
APPLICATION NO. : 15/839131
DATED : December 4, 2018
INVENTOR(S) : Zhang et al.

It is certified that error appears in the above-identified patent and that said Letters Patent is hereby corrected as shown below:

In the Claims

Column 8:
Claim 12, Line 44;
After "receive" delete "user."

Signed and Sealed this
Twenty-sixth Day of February, 2019

Andrei Iancu
*Director of the United States Patent and Trademark Office*